US 11,280,233 B2

(12) United States Patent
Isoshima et al.

(10) Patent No.: US 11,280,233 B2
(45) Date of Patent: Mar. 22, 2022

(54) VENTILATOR-EQUIPPED ENGINE

(71) Applicant: KUBOTA Corporation, Osaka (JP)

(72) Inventors: Hiroaki Isoshima, Sakai (JP); Takeshi Kawasaki, Sakai (JP); Yuichiro Yamada, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/119,514

(22) Filed: Dec. 11, 2020

(65) Prior Publication Data

US 2021/0189924 A1    Jun. 24, 2021

(30) Foreign Application Priority Data

Dec. 20, 2019    (JP) .............................. JP2019-230942

(51) Int. Cl.
*F01M 13/00*    (2006.01)
*F01M 13/02*    (2006.01)
*F01M 13/04*    (2006.01)

(52) U.S. Cl.
CPC .......... *F01M 13/022* (2013.01); *F01M 13/04* (2013.01); *F01M 2013/0044* (2013.01); *F01M 2013/0083* (2013.01); *F01M 2013/0438* (2013.01)

(58) Field of Classification Search
CPC .... F01M 13/022; F01M 13/023; F01M 13/04; F01M 13/0416; F01M 2013/0038; F01M 2013/0044; F01M 2013/005; F01M 2013/0083; F01M 2013/0438
USPC ........................................ 123/41.8, 572–574
See application file for complete search history.

(56) References Cited

U.S. PATENT DOCUMENTS

| 2,871,663 | A  | * | 2/1959 | Rich ...................... F02M 35/04 60/708 |
| 4,993,375 | A  | * | 2/1991 | Akihiko ............. F01M 13/0416 123/195 C |
| 7,210,471 | B2 | * | 5/2007 | Ikeda ..................... F02M 25/06 123/572 |
| 2009/0188478 | A1 | * | 7/2009 | Terada ................... F02M 25/06 123/572 |
| 2010/0095922 | A1 | * | 4/2010 | Nakajima .......... F01M 13/0416 123/196 A |

(Continued)

FOREIGN PATENT DOCUMENTS

| EP | 3045692 A1 | 7/2016 |
| EP | 3290667 A1 | 3/2018 |

(Continued)

OTHER PUBLICATIONS

Extended European Search Report dated May 17, 2021 in European Application No. 20209159.1.

*Primary Examiner* — George C Jin
*Assistant Examiner* — Teuta B Holbrook
(74) *Attorney, Agent, or Firm* — Panitch Schwarze Belisario & Nadel LLP

(57) ABSTRACT

The ventilator-equipped engine is configured to: guide a blow-by gas generated in a crankcase to an intake passage through an inside of a cylinder head, an inside of a head cover, and a pressure regulating valve; and to directly introduce fresh air into an internal space of the cylinder head by providing a fresh air introduction passage that extends across the intake passage and the cylinder head.

11 Claims, 12 Drawing Sheets

(56) References Cited

U.S. PATENT DOCUMENTS

| | | | | |
|---|---|---|---|---|
| 2010/0101514 A1* | 4/2010 | Hirano | ............... | F01M 13/022 |
| | | | | 123/41.86 |
| 2011/0056455 A1* | 3/2011 | Koyamaishi | ........... | F01M 13/04 |
| | | | | 123/196 A |
| 2014/0303875 A1* | 10/2014 | Tsukagoshi | ........... | F02D 19/084 |
| | | | | 701/104 |
| 2015/0337698 A1* | 11/2015 | Ruppel | ............... | B01D 46/543 |
| | | | | 123/41.86 |
| 2016/0333755 A1* | 11/2016 | Kira | ...................... | F01M 13/04 |
| 2017/0356316 A1* | 12/2017 | Suzuki | ............... | F01M 13/0416 |
| 2017/0362975 A1* | 12/2017 | Konishi | .................... | F02F 1/36 |
| 2018/0216509 A1* | 8/2018 | Brinker | .................. | B01D 45/08 |
| 2020/0141294 A1* | 5/2020 | Ishikawa | ............... | F01M 13/04 |

FOREIGN PATENT DOCUMENTS

| | | | |
|---|---|---|---|
| JP | 2012057574 A | 3/2012 | |
| JP | 2012057575 A | 3/2012 | |
| JP | 2013234641 A | 11/2013 | |
| JP | 2018168814 A | 11/2018 | |
| WO | 2008104892 A2 | 9/2008 | |

\* cited by examiner

VENTILATOR-EQUIPPED ENGINE

CROSS-REFERENCE TO RELATED APPLICATION

This application claims priority under 35 U.S.C. § 119(b) to Japanese Patent Application No. 2019-230942 filed on Dec. 20, 2019, the disclosure of which is incorporated herein by reference in its entirety.

BACKGROUND OF THE INVENTION

Field of the Invention

The present invention relates to a ventilator-equipped engine.

Description of Related Art

A blow-by gas recirculation device is configured to guide a blow-by gas generated in a crankcase to an intake passage through the inside of a cylinder head, the inside of a head cover, and a pressure regulating valve.

In order to effectively prevent an increase in pressure in the engine and oil contamination due to a blow-by gas, some engines employ a configuration in which a fresh air introduction passage and a blow-by gas discharge passage are connected to the inside of the engine, and a blow-by gas is returned to an intake passage using these passages.

Normally, in a ventilator-equipped engine, a blow-by gas is returned to an intake passage by a negative pressure of the intake passage through a pressure regulating valve, the internal pressure of the engine (the crankcase) is adjusted, and fresh air is introduced from a fresh air introduction passage. When a high load is applied, an amount of blow-by gas exceeds the flow rate regulated by the pressure regulating valve, so that the blow-by gas may be returned to the intake passage through the fresh air introduction passage.

The above-mentioned prior arts employ a structure for supplying fresh air from the intake passage into a head cover. From the viewpoint of the structure in which the blow-by gas is extracted from a gas outlet provided with a pressure regulating valve in the head cover, fresh air supplied into the head cover may flow straight only through the inside of the head cover and may be discharged through the gas outlet without circulating in the crankcase in some cases. This may deteriorate ventilation efficiency inside the engine (crankcase).

SUMMARY OF THE INVENTION

An object of the present invention is to provide a ventilator-equipped engine which has been improved so as to enhance ventilation efficiency in the engine by further improving a structure for introducing fresh air into the engine.

In the present invention, a blow-by gas generated in a crankcase is guided to an intake passage through an inside of a cylinder head, an inside of a head cover, and a pressure regulating valve, and fresh air is directly introduced into an internal space of the cylinder head by providing a fresh air introduction passage that extends across the intake passage and the cylinder head.

It is favorable that a fresh air introduction chamber which is communicated with and connected to the fresh air introduction passage in the internal space is formed in a space different from a space where a valve operating component is disposed in the internal space, and it is more favorable that the fresh air introduction chamber is provided to the cylinder head on a side where an intake manifold is provided, or provided to the cylinder head so as to be adjacent to a water jacket.

It is favorable that the internal space has a curved path. It is more favorable that a connection point between the intake passage and the fresh air introduction passage is located upstream of a blow-by gas return point in the intake passage with respect to a fresh air flowing direction.

According to the present invention, fresh air is introduced into the internal space of the cylinder head. This configuration can prevent the fresh air from flowing straight through only the inside of the head cover and being discharged to the gas outlet of the head cover. Thus, the intended ventilation effect achieved by introducing fresh air into the crankcase is enhanced.

Therefore, the ventilation effect is enhanced as compared with a configuration where fresh air is supplied to the head cover, and a risk that the fresh air introduction passage is closed is decreased as compared with a configuration in which fresh air is supplied into the crankcase. Accordingly, a ventilator that can enhance the ventilation effect while decreasing a possibility of closure due to freezing can be achieved.

As a result, it is possible to provide a ventilator-equipped engine which has been improved so as to enhance ventilation efficiency in the engine.

DETAILED DESCRIPTION OF PREFERRED EMBODIMENTS

Figure 1:
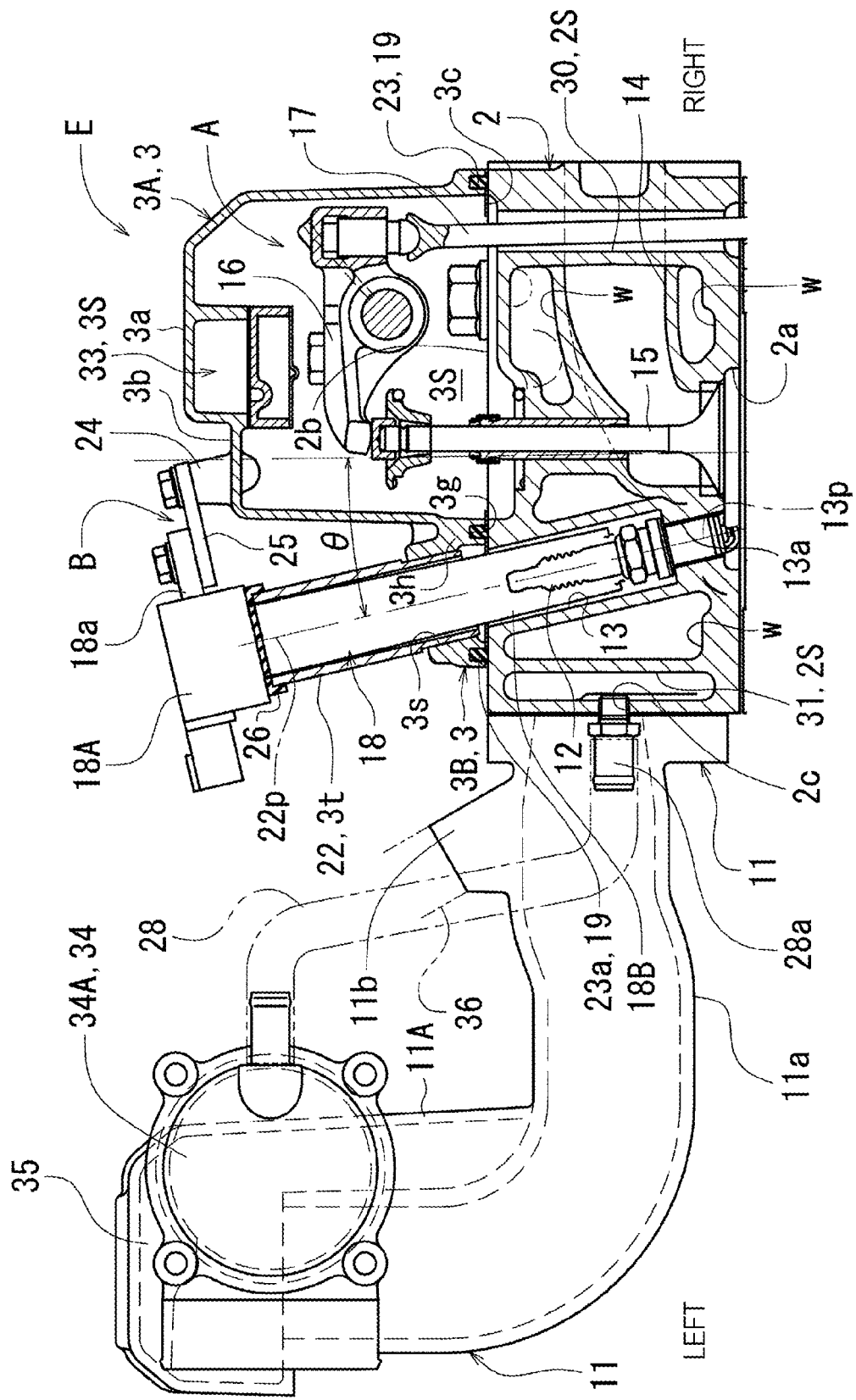
FIG. 1 is a partially cutout front view showing a main part of a structure for supplying fresh air.

An embodiment of a ventilator-equipped engine according to the present invention will be described with reference to the drawings, taking an example in which the ventilator-equipped engine is an industrial spark ignition engine (gasoline engine, etc.) used for agricultural machinery, construction machinery, generators, working machines, and the like.

As shown in FIGS. 5 to 8, a spark ignition engine E (hereinafter, simply referred to as "engine") includes a cylinder block 1, a cylinder head 2 mounted on the cylinder block, and a head cover 3 mounted on the cylinder head 2. The cylinder block 1 has a crankcase 1A below which an oil pan 4 is mounted, and a cylinder 1B which houses a piston (not shown).

The engine E is equipped with a transmission belt 5, an engine cooling fan 6, a water flange 7, and the like on the front part, and a flywheel housing 8 on the rear part.

The engine E is equipped with an exhaust manifold 9 and an exhaust cover 10 covering the exhaust manifold 9 on the upper left side, and an intake manifold 11 and the like on the upper right side.

As shown in FIG. 1, this engine E is equipped with a spark plug 12 as a unit for causing combustion in a combustion chamber. The cylinder head 2 is formed with a flat combustion head recess 2a and plug holes 13 having female screw holes 13a that open in the combustion head recess 2a. Each plug hole 13 which is a deep downward hole having a circular cross section, that is, a hole axis 13p, is an oblique hole slightly inclined at an inclination angle θ with respect to the vertical line.

In FIG. 1, the cylinder head 2 is formed with an exhaust port 14 that opens into the combustion head recess 2a, and is provided with a valve operating mechanism A including an exhaust valve 15, a rocker arm 16, a push rod 17, and the like. Although not shown in FIG. 1, intake ports 37 (see FIGS. 10 and 11), intake valves, and the like are also formed in the cylinder head 2.

As shown in FIGS. 1 to 3 and 7, the head cover 3 includes a main cover part (valve operating mechanism housing part) 3A that covers the valve operating mechanism A, and a flange part 3B for supporting ignition-coil-integrated plug caps 18. The head cover 3 is placed on an upper surface 2b of the cylinder head 2 via a head cover gasket 19 and is fixed by means of a bolt.

Figure 7:
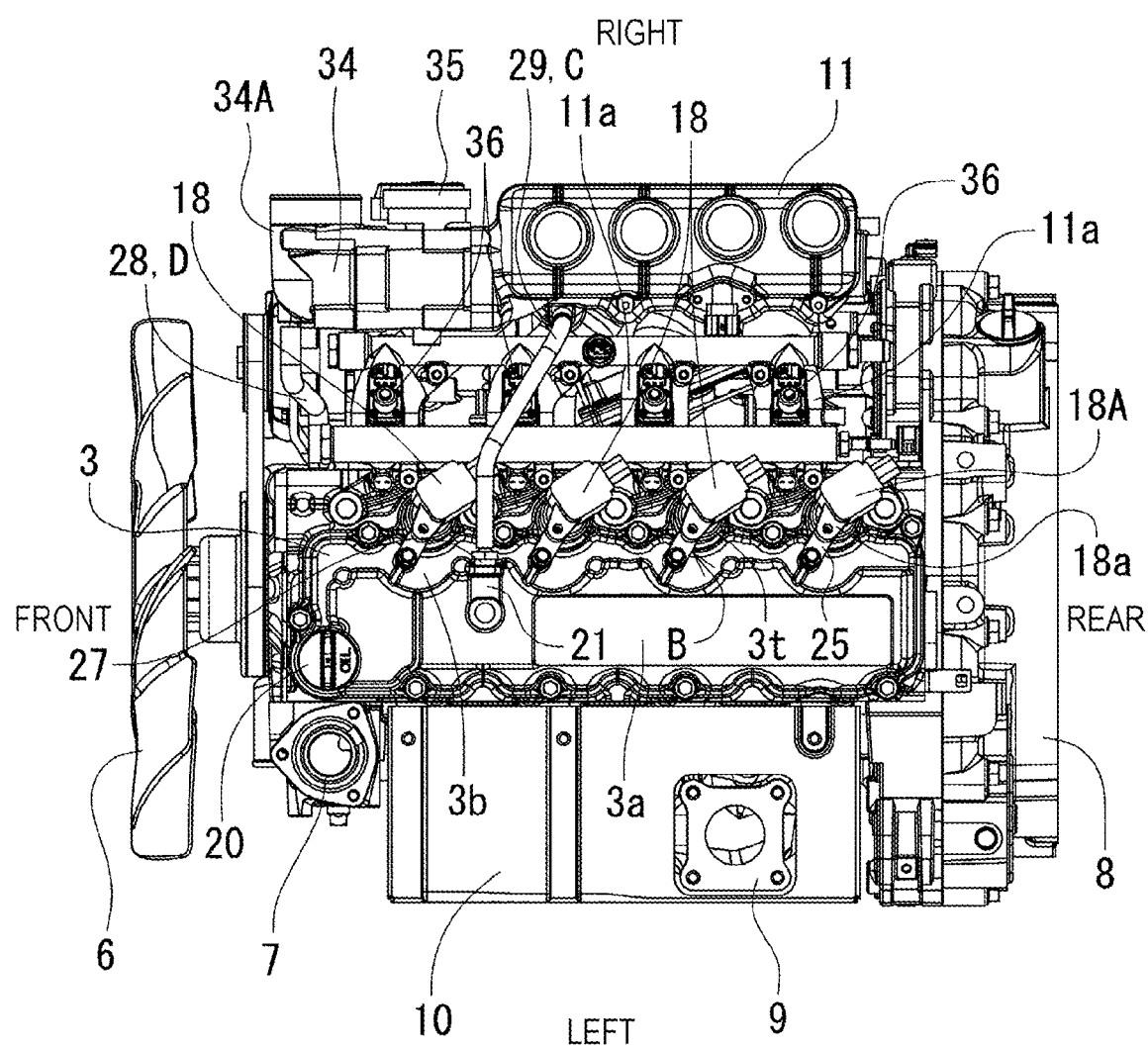
FIG. 7 is a plan view of the spark ignition engine.
Figure 8:
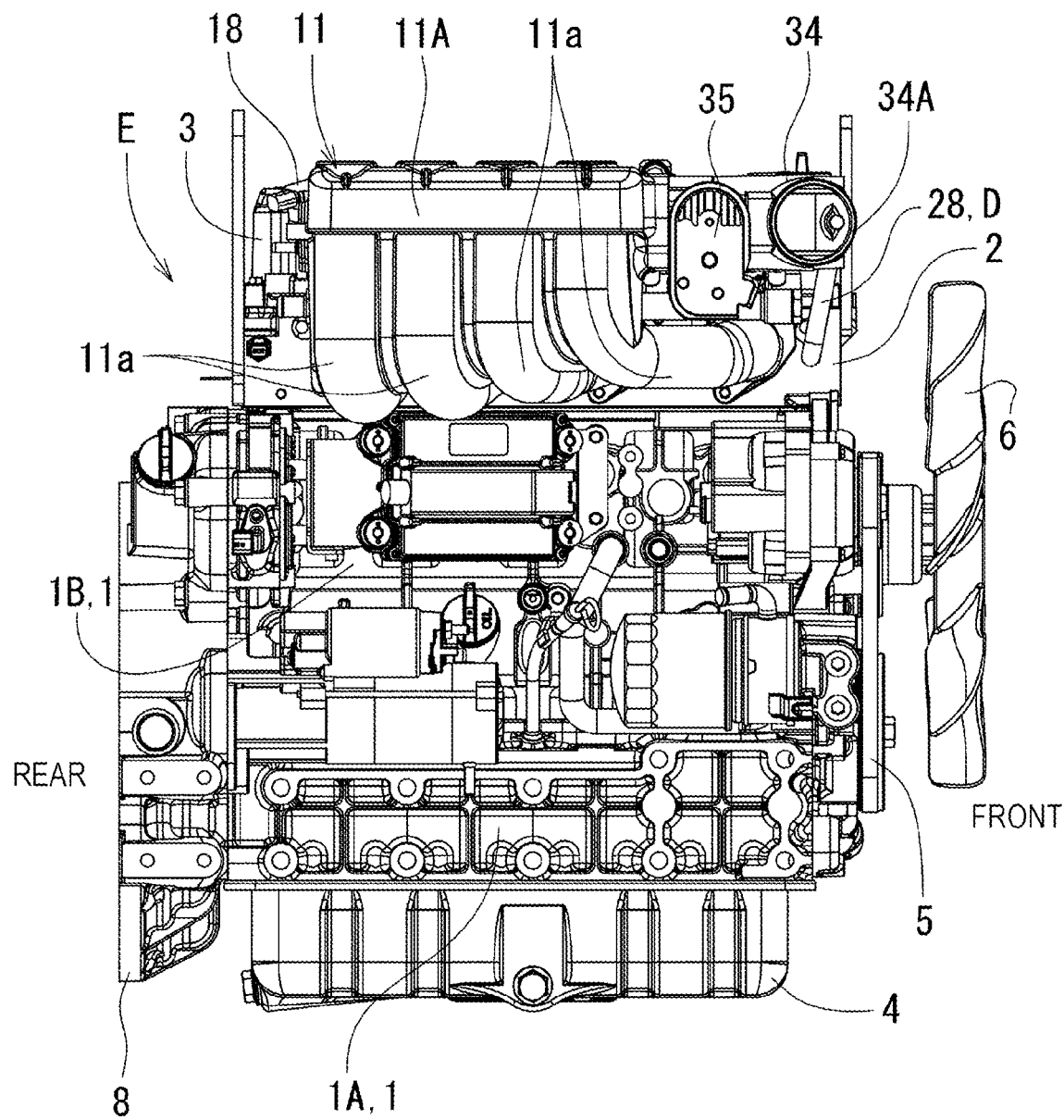
FIG. 8 is a right side view of the spark ignition engine.

The main cover part 3A has: a top wall 3a provided with an oil cap 20 for an engine oil supply port (not shown) and a gas outlet 21 which is a blow-by gas extraction part; and an upper wall 3b which is formed on the flange part 3B side of the top wall 3a and is slightly lower than the top wall 3a. A PCV valve 27, which is an example of a pressure regulating valve, is housed in the gas outlet 21, and as shown in FIG. 7, a recirculation hose 29 is connected to the PCV valve 27 and the intake manifold 11.

The flange part 3B is a portion covering four plug holes 13 arranged in the front-rear direction in the cylinder head 2, and includes a flange body part 3h connected to the main cover part 3A and four cylindrical parts 3t. Each cylindrical part 3t is formed by inserting (fitting and engaging) a pipe material 22 into a mounting hole part 3s by press fitting, the mounting hole part 3s being formed in the flange body part 3h so as to face the corresponding plug hole 13.

In the mounting hole part 3s and the cylindrical part 3t (pipe material 22), a pipe axis 22p is slightly inclined to the left at an inclination angle θ with respect to the vertical line, and the axis 22p of the mounting hole part 3s and the cylindrical part 3t coincide with the axis 13p of the plug hole 13. The head cover 3 is often made of metal such as aluminum alloy, and the cylindrical parts 3t (pipe materials 22) are often made of metal such as steel pipe.

Figure 4:
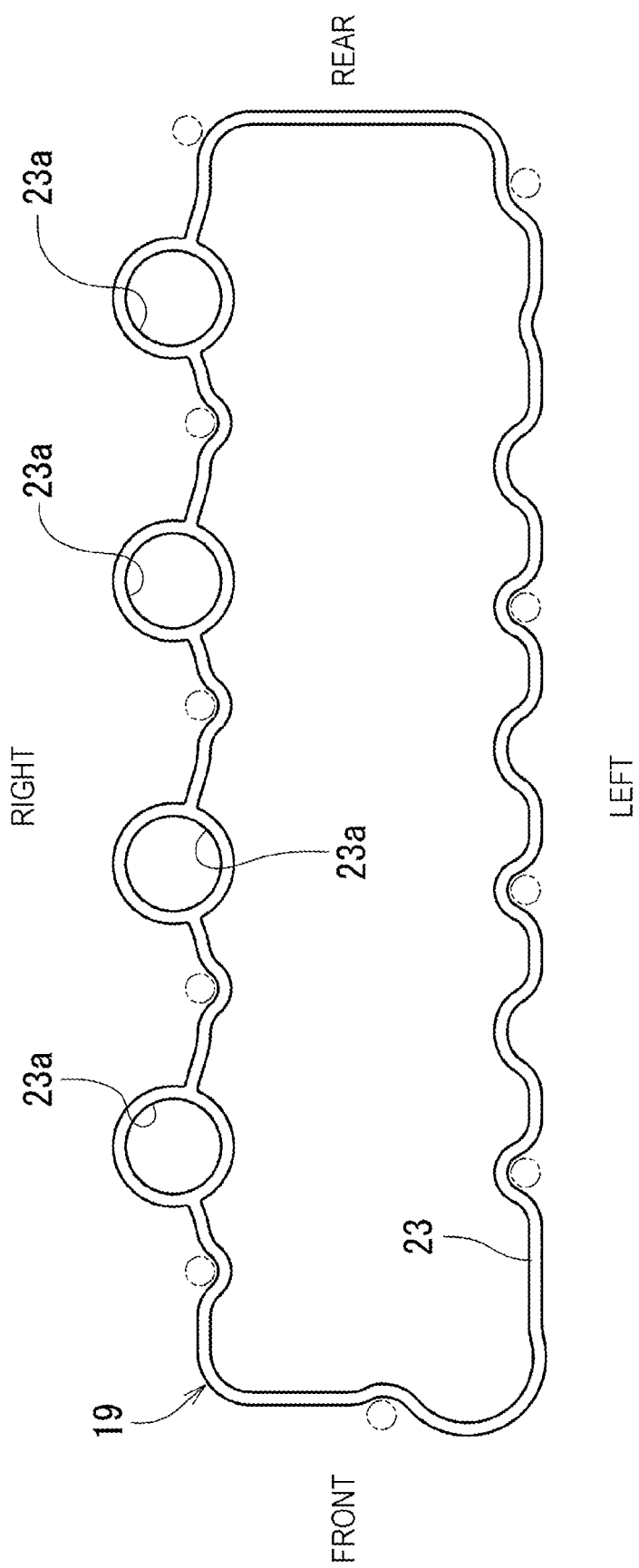
FIG. 4 is a plan view of a head cover gasket.
Figure 5:
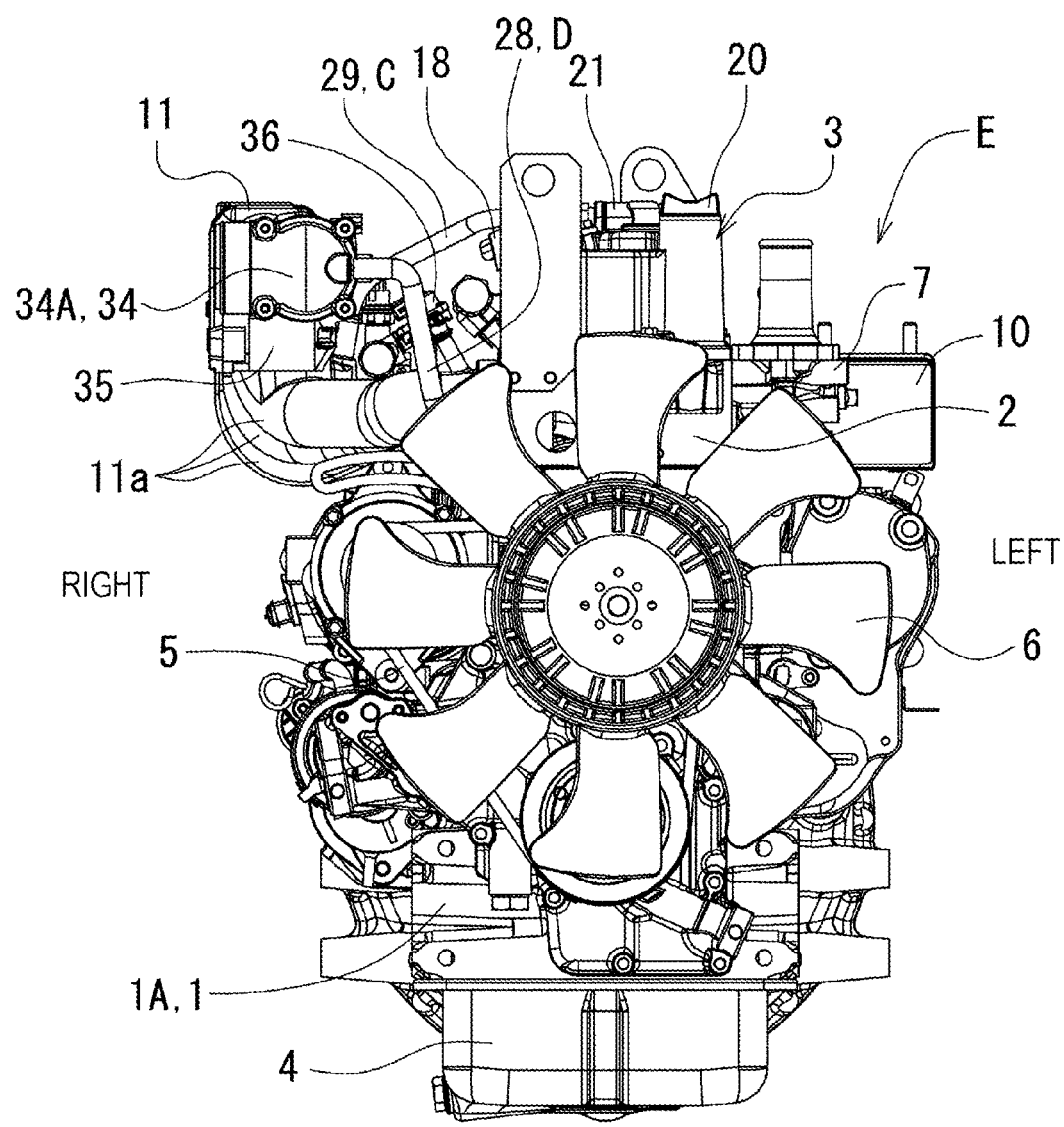
FIG. 5 is a front view of a spark ignition engine.

As shown in FIGS. 1 and 4, the head cover gasket 19 is interposed between the cylinder head 2 and the head cover 3. The head cover gasket 19 is made of rubber having a rectangular cross section, and is fitted and mounted in a gasket groove 3g opened at the bottom surface of the head cover 3.

The head cover gasket 19 is slightly compressed in the vertical direction in the gasket groove 3g when the head cover 3 is bolted to the cylinder head 2, and due to its repulsive force, a portion between the bottom surface 3c of the head cover 3 and the upper surface 2b of the cylinder head 2 is sealed. The head cover gasket 19 is formed with a main loophole 23 that surrounds the main cover part 3A and four punch holes 23a that surround the mounting hole parts 3s, respectively.

That is, cylindrical parts 3t into which the ignition-coil-integrated plug caps 18 are fitted and which can support the ignition-coil-integrated plug caps 18 are formed on the head cover 3 so as to face the corresponding plug holes 13 of the cylinder head 2, and the punch holes 23a corresponding to the plug holes 13 are formed in the head cover gasket 19 provided between the cylinder head 2 and the head cover 3.

Figure 2:
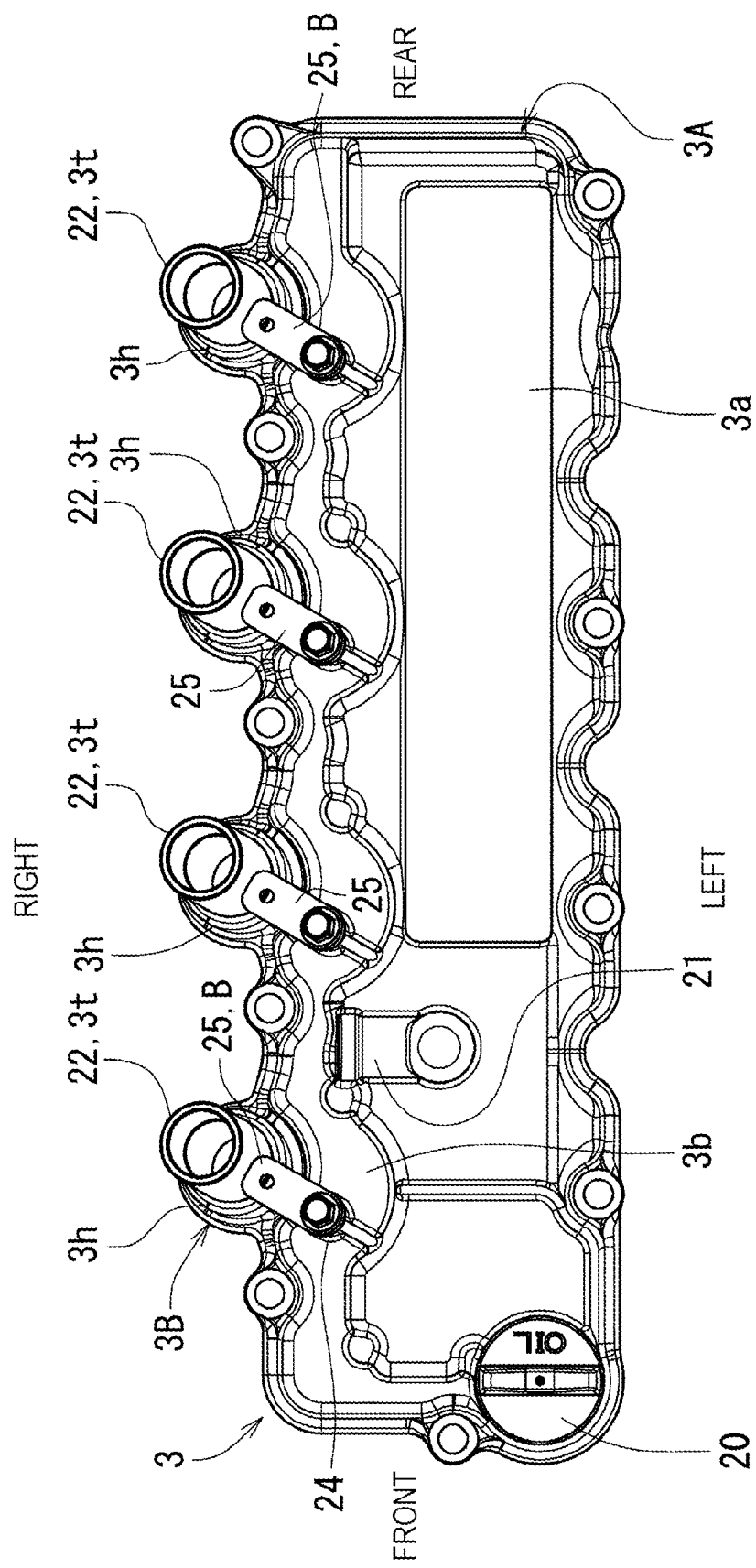
FIG. 2 is a plan view showing a head cover, etc.
Figure 3:
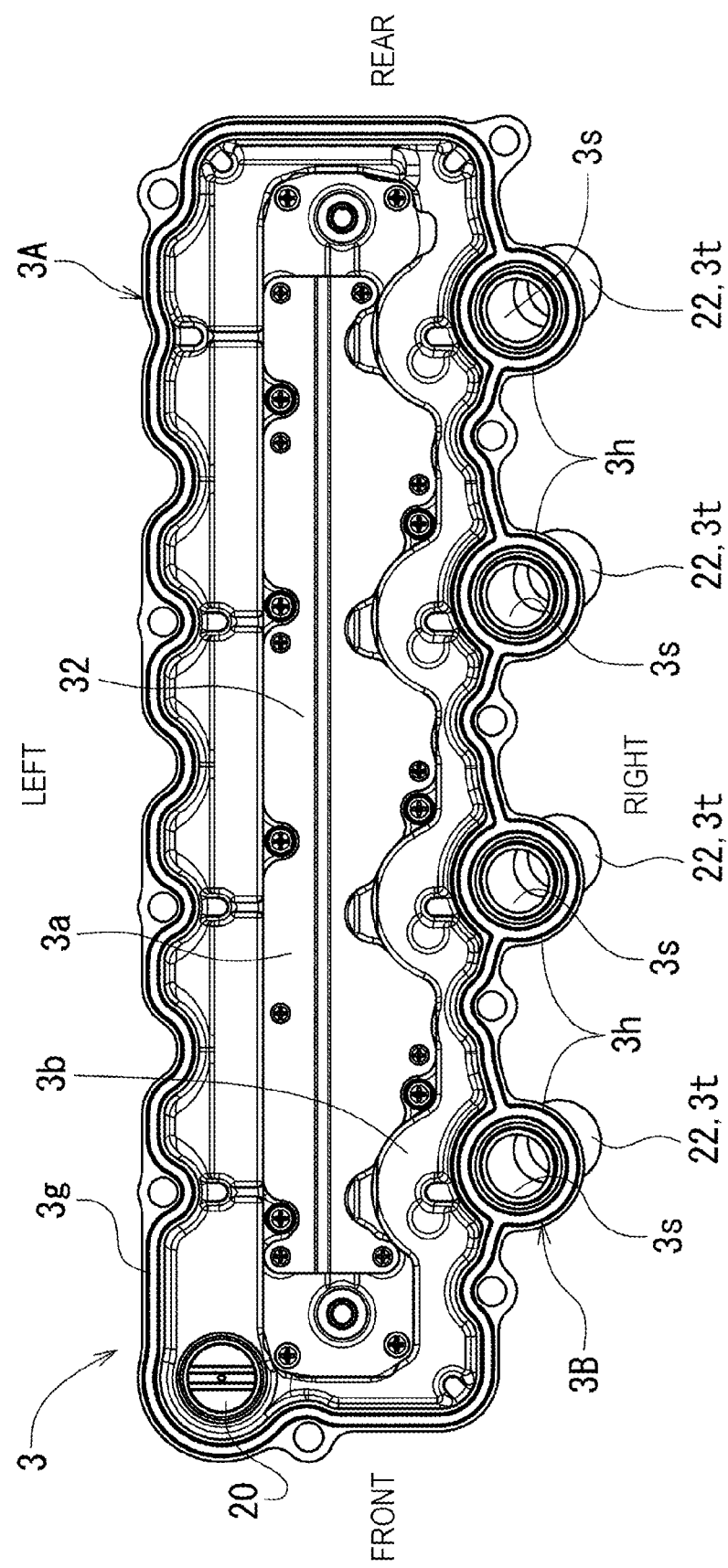
FIG. 3 is a bottom view of the head cover.
Figure 6:
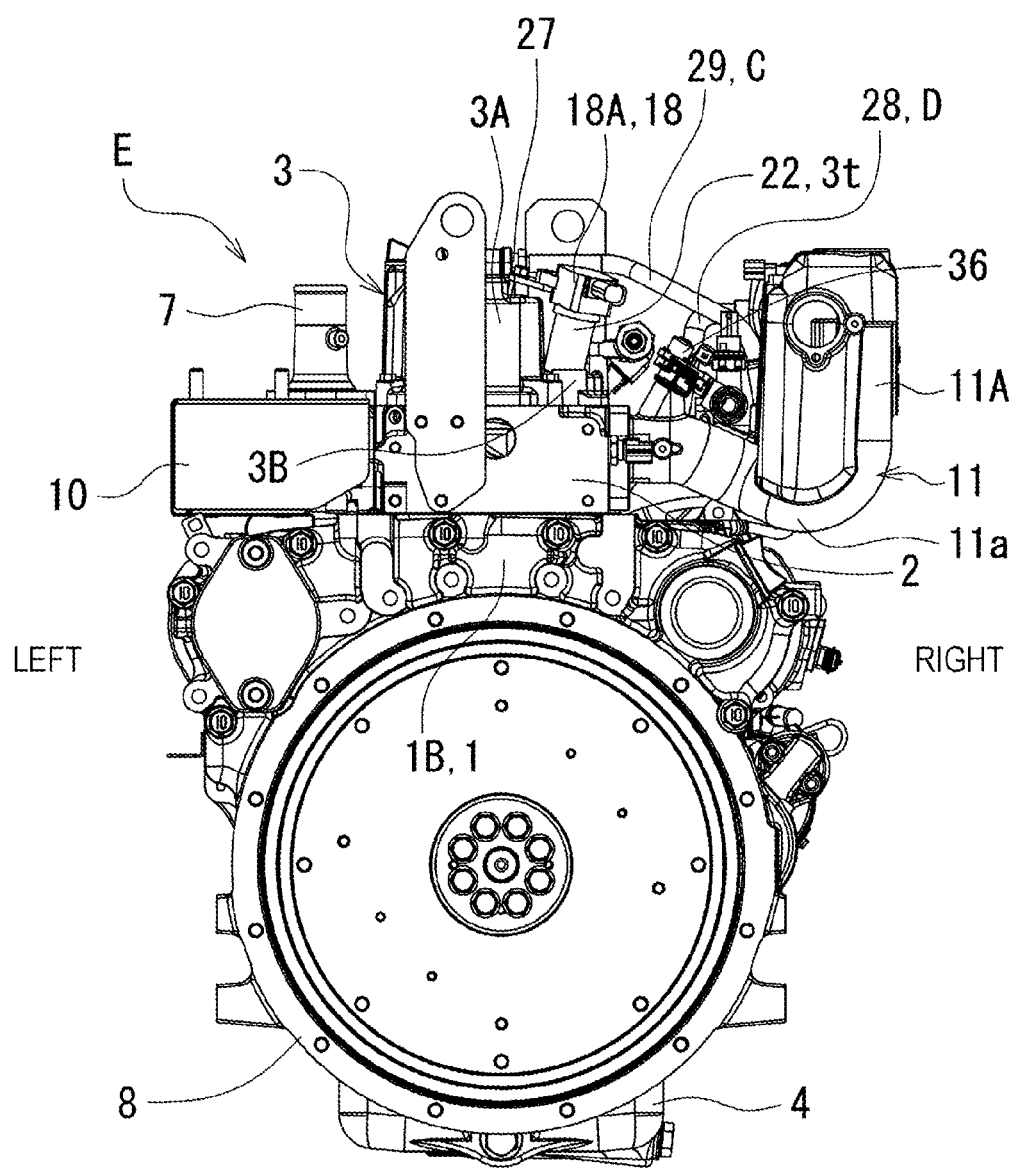
FIG. 6 is a rear view of the spark ignition engine.

As shown in FIGS. 1, 2 and 6, fixing units B are provided on an upper wall (an example of an outer wall) of the main cover part (valve operating mechanism housing part) 3A of the head cover 3. Each of the fixing units B prevents the corresponding ignition-coil-integrated plug cap 18 fitted in the cylindrical part 3t from being detached from the cylindrical part 3t.

The fixing unit B has, on the upper wall 3b, a female screw part 24 for screwing a coil housing part (igniter) 18A of the ignition-coil-integrated plug cap 18 fitted in the cylindrical part 3t.

A bracket 25 screwed to the coil housing part 18A is bolted to the female screw part 24, so that the ignition-coil-integrated plug cap 18 is kept fitted to the cylindrical part 3t. In other words, the bracket 25 which is a plate member is screwed to a protruding part 18a of the coil housing part 18A of the ignition-coil-integrated plug cap 18 inserted into the cylindrical part 3t and the female screw part 24 on the upper wall 3b.

The ignition-coil-integrated plug cap 18 is screwed and fixed to the head cover 3 using the bracket 25 in a fitted and mounted state where the lower part thereof is inserted and mounted to the spark plug 12, an upper end of a cylindrical cap part 18B is inserted into an upper end of the cylindrical part 3t, and a cap 26 made of a flexible material or elastic material (for example, rubber) is externally fitted to (engaged with) the upper end of the cylindrical part 3t.

Since the cylindrical part 3t is constructed using the pipe material 22 which is a separate member from the head cover 3, an unnecessary thickness due to a draft can be reduced, compared to a case where the cylindrical part 3t is formed on the flange part 3B by molding of the head cover, and further, an increase in cost due to the formation of a deep hole of cylindrical part by cutting work can also be prevented.

Figure 12:
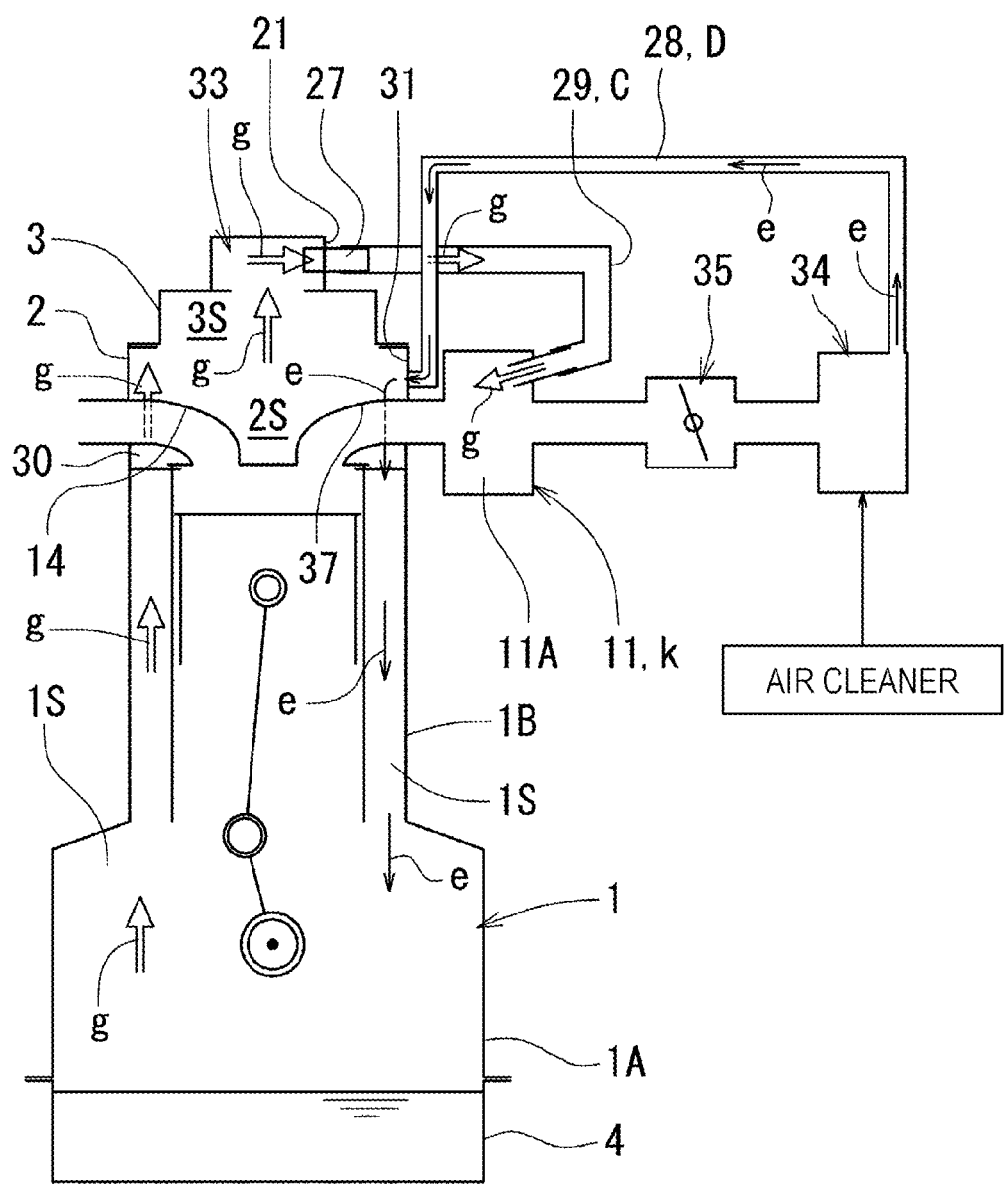
FIG. 12 is a schematic diagram showing a flow structure of a blow-by gas and fresh air.

Next, a blow-by gas recirculation device and a ventilator will be described. As shown in FIGS. 1, 7, and 12, a blow-by gas recirculation device C guides a blow-by gas generated in the crankcase 1A to an intake passage k through the inside of the cylinder head 2, the inside of the head cover 3, and the PCV valve 27. A ventilator D that directly introduces fresh air e in the intake passage k into an internal space 2S of the cylinder head 2 is formed by providing (installing) a fresh air introduction passage 28 that extends across (spans) the intake passage k and the cylinder head 2.

A blow-by gas g leaked into the crankcase 1A flows into the intake manifold 11 (an example of the intake passage k) through an internal space 1S(=inside the crankcase 1A) of the cylinder block 1, the internal space 2S of the cylinder head 2, an internal space (mainly, a valve operating chamber where valve operating components such as the rocker arm are disposed) 3S of the head cover 3, the gas outlet 21 (=PCV valve 27), and the recirculation hose 29. The internal space 2S of the cylinder head 2 includes, for example, a valve operating space where valve operating components such as intake and exhaust valves are disposed, and a fresh air introduction chamber 31 for introducing fresh air into the engine. A push rod chamber 30 where the push rod 17 is disposed is a valve operating space, but a cooling water passage (water jacket) or an intake/exhaust port are not included in the valve operating space. Note that a push rod chamber (no reference sign given) formed in the cylinder block 1 is included in the internal space 1S of the cylinder block 1.

A partition plate 32 which is long in the front-rear direction is provided inside the head cover 3 and bolted to the upper part of the head cover 3, and a gas passage 33 (a part of the internal space 3S) is formed between the partition plate 32 and the top wall 3a. A start end (no reference sign given) of the gas outlet 21 having the PCV valve 27 is in communication with the gas passage 33. It is favorable that the gas passage 33 is provided with a filter part for filtering an oil component in the blow-by gas and a structural part for dropping or moving down the captured oil component.

As shown in FIGS. 5 to 8, the intake manifold 11 includes an intake body 11A and four branch pipe parts 11a. The engine E includes an intake flange 34, a throttle 35, and injectors 36 mounted to the branch pipe parts 11a. The engine E is a dual-fuel engine. The injector 36 is attached to a fuel inlet seat 11b (see FIG. 1) formed at the upper end of each branch pipe part 11a. The branch pipe parts 11a are connected to the intake ports 37 (see FIGS. 10 and 11) of the cylinder head 2. Further, as shown in FIG. 12, air from an air cleaner enters the intake flange (an example of a connection point) 34.

The fresh air introduction passage 28 formed from a tube or pipe material extends across (spans) the right side of the front end of the cylinder head 2 (the side where the intake manifold 11 is disposed) and the intake flange 34 (an example of the intake passage k) in such a way that they are in communication with each other. Due to the fresh air introduction passage 28, the ventilator D is achieved which introduces fresh air e from the air cleaner (not shown) into the engine. The recirculation hose 29 is connected to the intake manifold 11 so as to communicate with the inside of the intake body (return point of the blow-by gas) 11A.

That is, the intake flange 34 to which the fresh air introduction passage 28 is connected in the intake passage k is located on the upstream side of the throttle 35 in the fresh air flowing direction, and the intake body 11A, which is the blow-by gas return point in the intake passage k, is located on the downstream side of the throttle 35 in the fresh air flowing direction. This configuration provides an advantage that the fresh air introduction passage 28 is supplied with fresh air without recirculation of the blow-by gas g.

As shown in FIGS. 1 and 9 to 11, a fresh air introduction chamber 31 extending in the front-rear direction is formed in the cylinder head 2 on the side where the intake manifold 11 is disposed, the fresh air introduction chamber 31 communicating with the peripheral portions of the intake ports 37. The fresh air introduction chamber 31 formed on the right side of the cylinder head 2 is a space different from the push rod chamber 30 (valve operating space) which is formed on the left side of the cylinder head 2 (the side where the exhaust manifold is disposed) and in which a large amount of oil mist scatters.

The fresh air introduction passage 28 is communicated with and connected to the fresh air introduction chamber 31 via a mounting plug 28a screwed to a screw hole 2c of the cylinder head 2. The fresh air introduction chamber 31 communicates with only the internal space 1S of the cylinder block 1 through five communication holes 38 which are formed in the cylinder head 2 so as to be in communication with the fresh air introduction chamber 31 and so as to be open on the cylinder block side (downward) (see FIGS. 9 to 11). On the other hand, the push rod chamber 30 communicates with the internal spaces 1S and 3S of the cylinder block 1 and the head cover 3, respectively. Note that the fresh air introduction chamber 31 may be communicated with the internal space 3S of the head cover 3 by a small hole or the like.

As shown in FIG. 12, the blow-by gas g leaked into the crankcase 1A enters the internal space 3S of the head cover 3 from the internal space 1S of the cylinder block 1 through the push rod chamber 30, and then flows into the intake body 11A through the gas passage 33, the gas outlet 21, the PCV valve 27, and the recirculation hose 29.

Fresh air enters the fresh air introduction chamber 31 (internal space 2S) of the cylinder head 2 through the intake flange 34 and the fresh air introduction passage 28, and is supplied into the internal space 1S of the cylinder block 1 through the communication holes 38.

In FIG. 1, the cylinder head 2 is provided with water jackets (cooling water passages) w at locations between the fresh air introduction chamber 31 and the plug holes 13 and at locations above and below the exhaust port 14.

Figure 9:
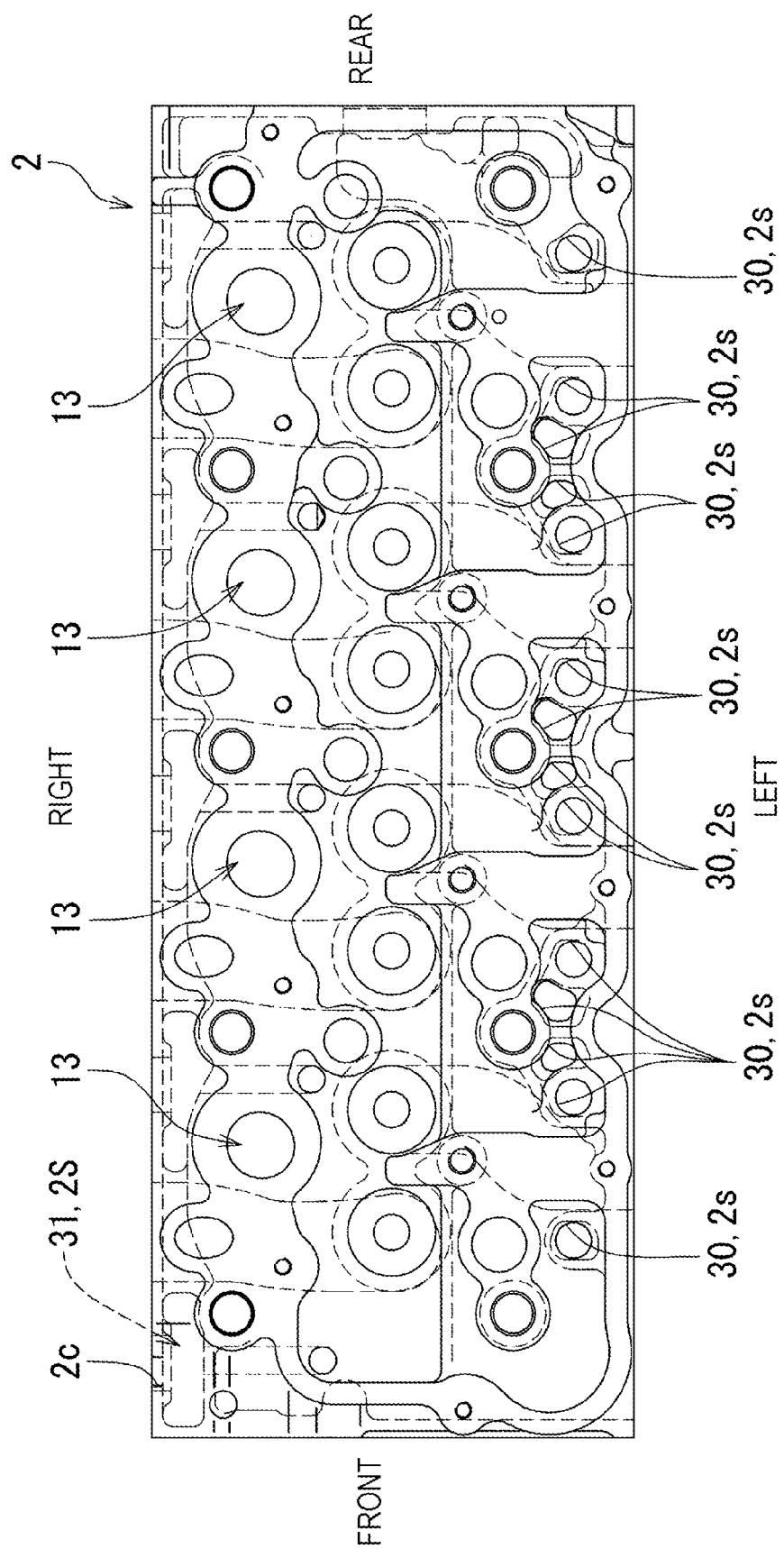
FIG. 9 is a plan view of a cylinder head.
Figure 10:
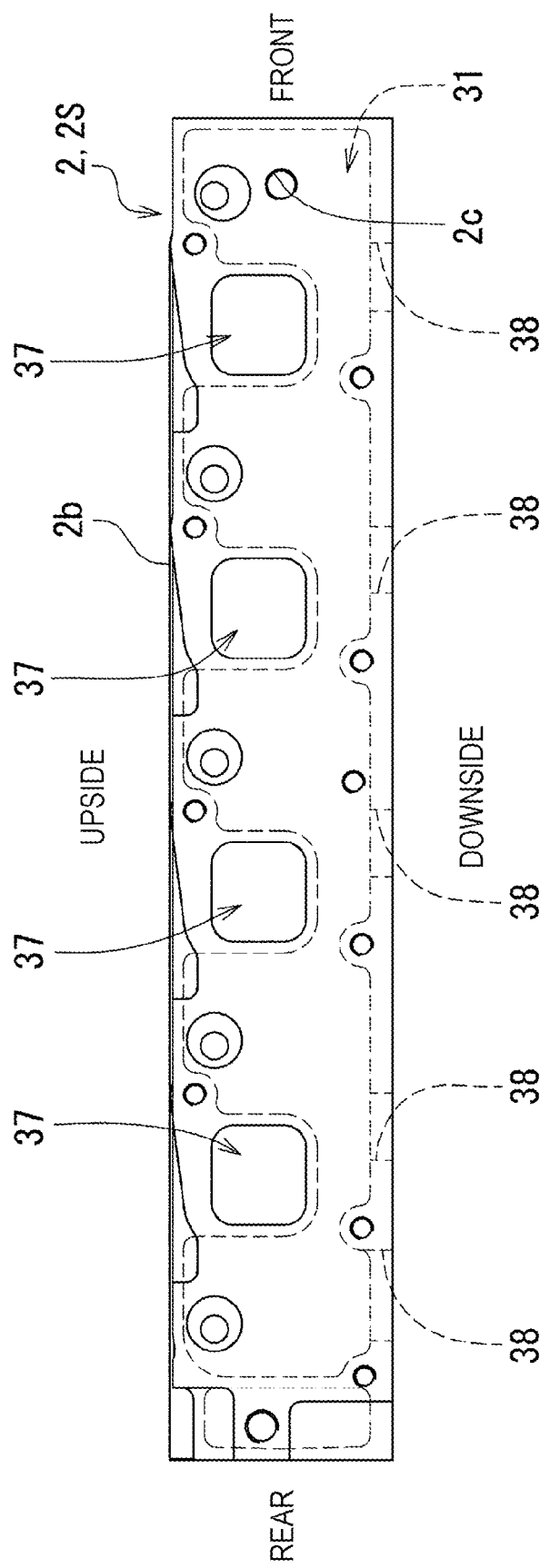
FIG. 10 is a right side view of the cylinder head.
Figure 11:
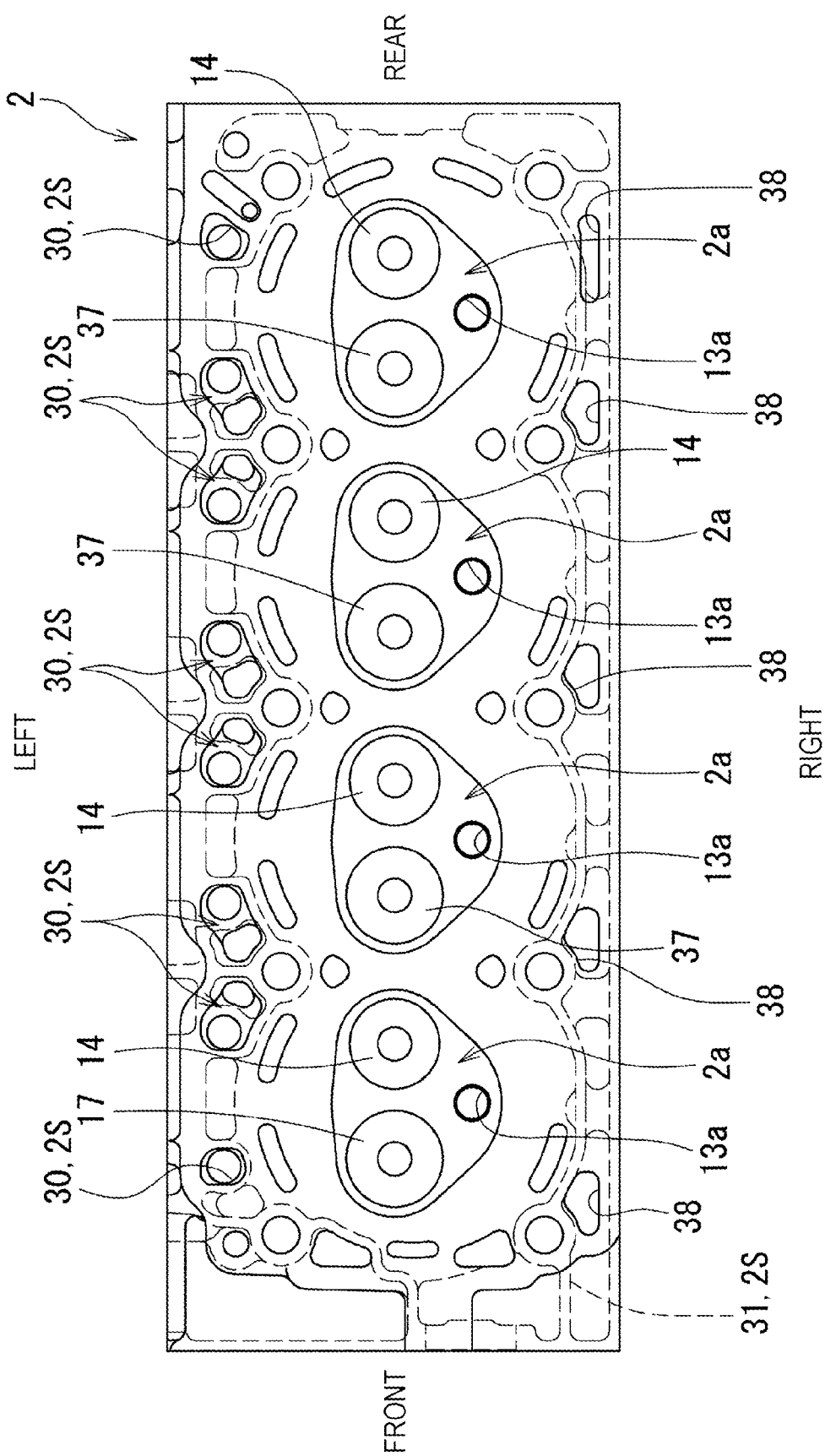
FIG. 11 is a bottom view of the cylinder head.

Further, as shown in FIGS. 9 to 11, the fresh air introduction chamber 31 having a flat shape which is long in the front-rear direction and short in the horizontal direction and the communication holes 38 (internal space 2S) in the front-rear direction form a curved passage serving as a flow path of fresh air.

That is, the internal space 2S of the cylinder head 2 includes the fresh air introduction chamber 31, the communication holes 38, and the valve operating space (push rod chamber 30 or the like). The fresh air introduction chamber 31 (and the communication holes 38) and the valve operating space (push rod chamber 30) are independent spaces. The fresh air introduction chamber 31 is provided adjacent to the water jacket w, and the internal space 2S including the fresh air introduction chamber 31 and the communication holes 38 is defined by a curved path.

Operation and Effect

The point at which fresh air is introduced into the engine E is set to the cylinder head 2. This configuration prevents fresh air from taking a shorter route through the inside of the head cover 3 and being discharged through the gas outlet, compared to the configuration in which the point where fresh air is introduced is set on the head cover 3. Accordingly, a ventilation effect achieved by introducing fresh air into the crankcase 1A is further enhanced.

Since the fresh air introduction chamber 31 is a space having no valve operating components, oil mist in the blow-by gas g flowing through the fresh air introduction passage 28 can be suppressed. The fresh air introduced into the fresh air introduction chamber 31 is mostly or all supplied to the internal space 1S of the cylinder block 1, which provides an advantage of enhancing the ventilation effect in the crankcase 1A.

When the pressure regulating valve is closed due to freezing at extremely low temperatures or when a high load is applied, the fresh air introduction passage 28 also serves as a passage for the blow-by gas g, and it is necessary to suppress oil mist in the blow-by gas g. Since the fresh air introduction passage 28 is a pipeline or the like and is exposed to the outside air, the fresh air introduction passage 28 may also freeze and be closed at extremely low temperatures in, for example, midwinter. This "risk of closure" is more significant when the fresh air introduction passage 28 is long. (In the prior art in which the fresh air introduction passage 28 is directly connected to the head cover incorporating the valve operating mechanism, the connection position is restricted in relation to the oil mist, so that the fresh air introduction passage is likely to be long.)

The configuration in which the fresh air introduction chamber 31 is provided separately from the valve operating space such as the push rod chamber 30 provides an advantage of being capable of controlling oil mist. Further, this configuration can prevent or suppress introduced fresh air from taking a shorter route through the internal space 2S of the cylinder head 2 and flowing straight through the internal space 3S of the head cover 3. Further, the configuration in which the fresh air introduction chamber 31 is provided in the cylinder head 2 on the side where the intake manifold 11 is disposed or at the end of the side can decrease the fresh air introduction passage 28, and provides an advantage of being capable of further preventing the closure of the fresh air introduction passage 28 due to freezing.

When the fresh air introduction chamber 31 is adjacent to the water jacket w, heat exchange between the fresh air e introduced into the cylinder head 2 and cooling water is easy to be quickly performed, and a risk of freezing of the fresh air introduction passage 28 can be further reduced. When the fresh air introduction chamber 31 has a curved path, fresh air is prevented from flowing straight through the internal space 2S of the cylinder head 2, and thus, the ventilation effect achieved by introducing fresh air into the internal space 1S of the cylinder block 1 can be enhanced.

ANOTHER EMBODIMENT

The place where fresh air is directly introduced in the internal space 2S of the cylinder head 2 may be located at a position other than the fresh air introduction chamber 31. For example, the fresh air introduction passage 28 can be connected to the cylinder head 2 such that a small number (for example, one or two) of a lot of push rod chambers 30 (valve operating space, and also the internal space 2S) are set as the locations where fresh air is introduced.

What is claimed is:

1. A ventilator-equipped engine that is configured to:
   guide a blow-by gas generated in a crankcase to an intake passage through an inside of a cylinder head, an inside of a head cover, and a pressure regulating valve;
   directly introduce fresh air into an internal space of the cylinder head, without having the fresh air flow through the head cover, by providing a fresh air introduction passage that extends across the intake passage and the cylinder head; and,
   wherein a fresh air introduction chamber that communicates with and is connected to the fresh air introduction passage in the internal space is formed in a space different from a space in the internal space where a valve operating component is disposed.

2. The ventilator-equipped engine according to claim 1, wherein the fresh air introduction chamber is provided in the cylinder head on a side where an intake manifold is disposed.

3. The ventilator-equipped engine according to claim 2, wherein the fresh air introduction chamber is provided in the cylinder head so as to be adjacent to a water jacket.

4. The ventilator-equipped engine according to claim 3, wherein the internal space has a curved path.

5. The ventilator-equipped engine according to claim 2, wherein the internal space has a curved path.

6. The ventilator-equipped engine according to claim 2, wherein a connection point between the fresh air introduction passage and the intake passage is located upstream of a return point of the blow-by gas in the intake passage with respect to a fresh air flowing direction.

7. The ventilator-equipped engine according to claim 1, wherein the fresh air introduction chamber is provided in the cylinder head so as to be adjacent to a water jacket.

8. The ventilator-equipped engine according to claim 7, wherein the internal space has a curved path.

9. The ventilator-equipped engine according to claim 7, wherein a connection point between the fresh air introduction passage and the intake passage is located upstream of a return point of the blow-by gas in the intake passage with respect to a fresh air flowing direction.

10. The ventilator-equipped engine according to claim 1, wherein the internal space has a curved path.

11. The ventilator-equipped engine according to claim 1, wherein a connection point between the fresh air introduction passage and the intake passage is located upstream of a return point of the blow-by gas in the intake passage with respect to a fresh air flowing direction.

* * * * *